United States Patent
Murrish et al.

(10) Patent No.: US 10,319,109 B2
(45) Date of Patent: Jun. 11, 2019

(54) INTERACTION WITH PHYSICAL OBJECTS AS PROXY OBJECTS REPRESENTING VIRTUAL OBJECTS

(71) Applicant: Honda Motor Co., Ltd., Tokyo (JP)

(72) Inventors: Robert Wesley Murrish, Santa Clara, CA (US); John P. Moon, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 15/475,202

(22) Filed: Mar. 31, 2017

(65) Prior Publication Data

US 2018/0285631 A1    Oct. 4, 2018

(51) Int. Cl.
| | | |
|---|---|---|
| G05B 15/00 | (2006.01) | |
| G05B 19/00 | (2006.01) | |
| G06T 7/70 | (2017.01) | |
| B25J 9/16 | (2006.01) | |

(52) U.S. Cl.
CPC .............. *G06T 7/70* (2017.01); *B25J 9/1694* (2013.01); *G05B 2219/39014* (2013.01)

(58) Field of Classification Search
CPC . G06T 7/70; B25J 9/1694; G05B 2219/39014
See application file for complete search history.

(56) References Cited

U.S. PATENT DOCUMENTS

| | | | | |
|---|---|---|---|---|
| 4,839,838 A | * | 6/1989 | LaBiche | G01P 15/0888 345/157 |
| 5,577,981 A | * | 11/1996 | Jarvik | A63B 21/154 434/247 |
| 5,694,013 A | * | 12/1997 | Stewart | B25J 9/1656 318/561 |
| 5,858,291 A | * | 1/1999 | Li | B29C 70/882 264/105 |
| 6,104,379 A | * | 8/2000 | Petrich | G06F 3/014 345/156 |
| 6,126,373 A | * | 10/2000 | Yee | B25J 13/02 414/5 |
| 7,920,124 B2 | * | 4/2011 | Tokita | G06F 3/011 345/156 |
| 8,108,190 B2 | * | 1/2012 | Riener | G09B 23/32 434/267 |

(Continued)

*Primary Examiner* — Khoi H Tran
*Assistant Examiner* — Jorge O Peche
(74) *Attorney, Agent, or Firm* — Rankin, Hill & Clark LLP

(57) ABSTRACT

Systems and techniques for enabling interaction with physical objects as proxy objects representing virtual objects are provided herein. Virtual reality application data associated with a virtual reality application executed on a virtual reality device, a first virtual reality object data associated with a first virtual reality object from the virtual reality application, and virtual reality event data associated with one or more events from the virtual reality application may be received. Robotic arms including a robotic hand may grasp a first physical object which corresponds to the first virtual reality object of the virtual reality application. Sensors may detect a user interaction with the first physical object. Force feedback instructions commanding the robotic arms to move while maintaining grasp of the first physical object may be generated and executed based on detecting the user interaction with the first physical object and based on the virtual reality event data.

20 Claims, 10 Drawing Sheets

(56) References Cited

U.S. PATENT DOCUMENTS

| | | | | |
|---|---|---|---|---|
| 8,244,402 B2* | 8/2012 | Wells | ............... | G06K 9/3216 |
| | | | | 700/250 |
| 8,487,873 B2* | 7/2013 | Rosenberg | ............ | A63F 13/06 |
| | | | | 345/161 |
| 2002/0133264 A1* | 9/2002 | Maiteh | ............ | G05B 19/4097 |
| | | | | 700/182 |
| 2005/0148432 A1* | 7/2005 | Carmein | ............ | A63B 22/0235 |
| | | | | 482/8 |
| 2007/0078564 A1* | 4/2007 | Hoshino | ............ | G06K 9/00362 |
| | | | | 700/245 |
| 2009/0234788 A1* | 9/2009 | Kwok | ............... | G06N 3/006 |
| | | | | 706/46 |
| 2015/0235423 A1* | 8/2015 | Tobita | ............... | G06T 19/006 |
| | | | | 345/633 |
| 2016/0349835 A1* | 12/2016 | Shapira | ............... | G06F 3/011 |
| 2017/0010607 A1* | 1/2017 | Barlas | ............... | A63H 33/005 |
| 2017/0010671 A1* | 1/2017 | Ghaffari Toiserkan | ............... | |
| | | | | G06F 3/016 |
| 2017/0161555 A1* | 6/2017 | Kumar | ............... | G06K 9/00355 |
| 2018/0150387 A1* | 5/2018 | Kogan | ............... | G06F 9/455 |
| 2018/0182094 A1* | 6/2018 | Parra | ............... | G06T 7/0012 |
| 2018/0284760 A1* | 10/2018 | Gupta | ............... | G05D 1/0016 |
| 2018/0341386 A1* | 11/2018 | Inomata | ............... | G06F 3/04815 |
| 2019/0000578 A1* | 1/2019 | Yu | ............... | A61B 34/70 |
| 2019/0005838 A1* | 1/2019 | Yu | ............... | G06F 3/011 |
| 2019/0005848 A1* | 1/2019 | Garcia Kilroy | ............... | A61B 34/10 |

* cited by examiner

INTERACTION WITH PHYSICAL OBJECTS AS PROXY OBJECTS REPRESENTING VIRTUAL OBJECTS

BACKGROUND

Robots have been built for many purposes, and are often utilized in situations or scenarios as substitutes for humans. For example, robots may be used in environments such as bomb detection and de-activation, manufacturing processes, or other similar environments. Robots are often built to replicate human actions, such as walking, lifting, speech, cognition, etc. For example, a robot may recognize moving objects, postures, gestures, a surrounding environment, sounds or faces, or interact with humans, such as by facing a person when approached.

BRIEF DESCRIPTION

According to one aspect, a robotic system for enabling interaction with physical objects as proxy objects representing virtual objects is provided. The robotic system may include a communication interface, a memory, one or more robotic arms, one or more sensors, and a processor. The communication interface may receive virtual reality application data associated with a virtual reality application executed on a virtual reality device, a first virtual reality object data associated with a first virtual reality object from the virtual reality application, and virtual reality event data associated with one or more events from the virtual reality application. The memory may store the virtual reality application data, the first virtual reality object data, and the virtual reality event data as one or more instructions. One or more of the robotic arms may include a robotic hand grasping a first physical object which corresponds to the first virtual reality object of the virtual reality application. One or more of the sensors may detect a user interaction with the first physical object. A force feedback module of a processor may generate one or more force feedback instructions for one or more of the robotic arms. The force feedback instructions may command one or more of the robotic arms to move while maintaining grasp of the first physical object. The processor may execute one or more of the force feedback instructions based on detecting the user interaction with the first physical object and based on the virtual reality event data.

The robotic system may include a motor control module of the processor generating one or more motor control release instructions for one or more of the robotic arms. The motor control release instructions may command one or more of the robotic arms to release grasping of the first physical object. The processor may execute one or more of the motor control release instructions based on the virtual reality event data, a position of a user relative to the first physical object, or detecting no user interaction with the first physical object. The motor control module of the processor may generate one or more motor control grasp instructions for one or more of the robotic arms. The motor control grasp instructions may command one or more of the robotic arms to grasp a second physical object. The processor may execute one or more of the motor control grasp instructions based on the virtual reality event data or a position of the user relative to the second physical object. The robotic system may include one or more movement portions. One or more of the sensors may detect a position of a second physical object relative to the robotic system. The motor control module of the processor may generate one or more motor control movement instructions for one or more of the movement portions. The motor control movement instructions may command one or more of the movement portions to move the robotic system within a predetermined distance of the second physical object. The processor may execute one or more of the motor control movement instructions based on the virtual reality event data or a position of the user relative to the second physical object.

One or more of the sensors may detect a position of a user relative to the first physical object. The communication interface may receive a position of a user relative to the first physical object from the virtual reality device. One or more of the sensors may measure an amount of force associated with the user interaction of the first physical object. The communication interface may transmit data associated with the amount of force from the user interaction to the virtual reality device as virtual reality event data. The robotic system may include a virtual reality event module of the processor generating a second set of virtual reality event data based on the user interaction with the first physical object. The first virtual reality object may be a control device within the virtual reality application. The communication interface may transmit the second set of virtual reality event data to the virtual reality device. The virtual reality event data may be indicative of an event from the virtual reality application of a user approaching the first virtual reality object.

According to one aspect, a method for enabling interaction with physical objects as proxy objects representing virtual objects using a robotic system includes receiving virtual reality application data associated with a virtual reality application executed on a virtual reality device, receiving a first virtual reality object data associated with a first virtual reality object from the virtual reality application, receiving virtual reality event data associated with one or more events from the virtual reality application, grasping a first physical object which corresponds to the first virtual reality object of the virtual reality application using one or more robotic arms including a robotic hand, detecting a user interaction with the first physical object using one or more sensors, generating one or more force feedback instructions for one or more of the robotic arms, wherein the force feedback instructions command one or more of the robotic arms to move while maintaining grasp of the first physical object, and executing one or more of the force feedback instructions based on detecting the user interaction with the first physical object and based on the virtual reality event data.

The method may include generating one or more motor control release instructions for one or more of the robotic arms to command one or more of the robotic arms to release grasping of the first physical object and executing one or more of the motor control release instructions based on the virtual reality event data, a position of a user relative to the first physical object, or detecting no user interaction with the first physical object. The method may include generating one or more motor control grasp instructions for one or more of the robotic arms to command one or more of the robotic arms to grasp a second physical object and executing one or more of the motor control grasp instructions based on the virtual reality event data or a position of the user relative to the second physical object.

The method may include detecting a position of a second physical object relative to the robotic system, generating one or more motor control movement instructions for one or more movement portions to command one or more of the movement portions to move the robotic system within a predetermined distance of the second physical object, and executing one or more of the motor control movement instructions based on the virtual reality event data or a position of the user relative to the second physical object.

The method may include detecting a position of a user relative to the first physical object. The method may include receiving a detected position of a user relative to the first physical object. The method may include measuring an amount of force associated with the user interaction of the first physical object. The method may include transmitting data associated with the amount of force from the user interaction to the virtual reality device as virtual reality event data.

According to one aspect, a robotic system for enabling interaction with physical objects as proxy objects representing virtual objects is provided. The robotic system includes a communication interface, a memory, one or more robotic arms, one or more sensors, and a processor. The communication interface may receive virtual reality application data associated with a virtual reality application executed on a virtual reality device, a first virtual reality object data associated with a first virtual reality object from the virtual reality application, and virtual reality event data associated with one or more events from the virtual reality application. The memory may store the virtual reality application data, the first virtual reality object data, and the virtual reality event data as one or more instructions. One or more of the robotic arms may include a robotic hand grasping a first physical object which corresponds to the first virtual reality object of the virtual reality application. One or more of the sensors may detect a user interaction with the first physical object and a force associated with the user interaction. A force feedback module of a processor may generate one or more force feedback instructions for one or more of the robotic arms. The force feedback instructions may command one or more of the robotic arms to move while maintaining grasp of the first physical object. The processor may execute one or more of the force feedback instructions based on detecting the user interaction with the first physical object and based on the virtual reality event data.

DETAILED DESCRIPTION

Figure 1:
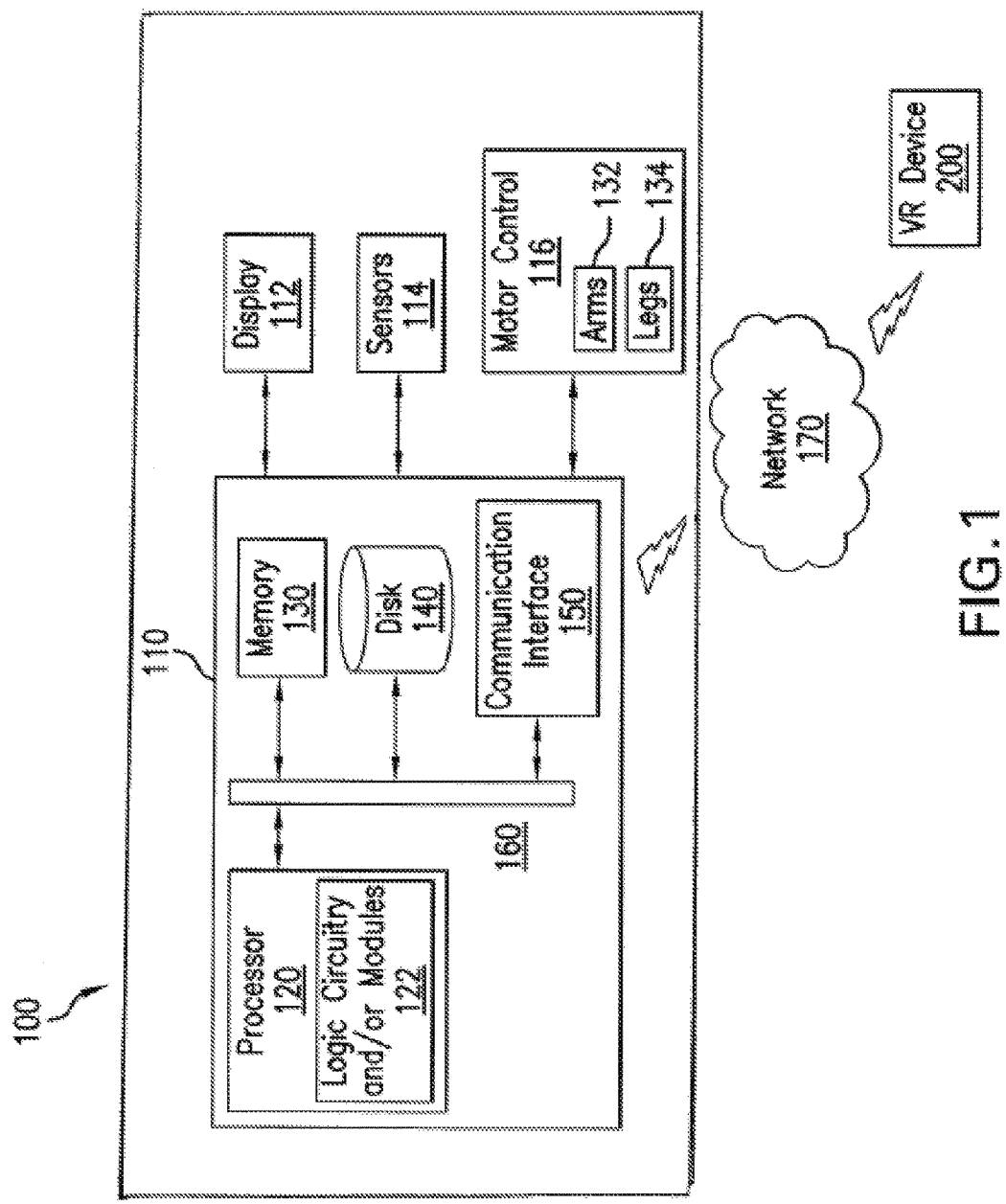
FIG. 1 is an illustration of an example robotic system for enabling interaction with physical objects as proxy objects representing virtual objects, according to one or more embodiments.

The following terms are used throughout the disclosure, the definitions of which are provided herein to assist in understanding one or more aspects of the disclosure. The definitions include various examples and/or forms of components that fall within the scope of a term and that may be used for implementation. The examples are not intended to be limiting.

A "computer communication", as used herein, refers to a communication between two or more systems or computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. As another example, the robotic system of FIG. 1 may receive information from a virtual reality device by computer communication over the network or perform computer communication using the bus or the communication interface.

A "processor", as used herein, may include a processing unit or microprocessors which execute instructions stored on the memory or the disk. A "processor", or "processing unit" as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

A "logic circuitry", as used herein, includes, but is not limited to, hardware, firmware, a non-transitory computer readable medium that stores instructions, instructions in execution on a machine, and/or to cause (e.g., execute) an action(s) from another logic circuitry, module, method, and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Conversely, where a single logic is described, it may be possible to distribute that single logic between multiple physical logics.

A "module", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules. Examples of modules may include a display control module controlling displaying or rendering of one or more applications within one or more zones of a display unit or display screen, an input module receiving one or more inputs from I/O devices, an application module running one or more applications on an operating system, an application management module managing the priority, order, default order, or other execution related aspects of one or more of the applications, an image generation module generating visual feedback associated with input received from the I/O devices, a force feedback module generating force feedback instructions for components of the robotic system, a motor control module generating motor control instructions (e.g., motor control release instructions, motor control grasp instructions, motor control movement instructions, etc.), a virtual reality event module of the processor generating virtual reality event data based on user interaction with a physical object, and so on.

A "computer-readable medium" or "computer-readable device", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

A "component", as used herein, refers to a computer-related entity (e.g., hardware of a robot, such as a controller, hardware of a computer, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

A memory may include a volatile memory and/or a nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store one or more instructions which include an operating system that controls or allocates resources of a computing device, one or more applications, and so on.

A "disk", as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). Similarly to the memory, the disk may store one or more instructions which include an operating system that controls or allocates resources of a computing device, one or more applications, and so on.

A "database", as used herein, is used to refer to a table. In other examples, a "database" may be used to refer to a set of tables. In still other examples, a "database" may refer to a set of data stores and methods for accessing and/or manipulating those data stores. A database may be stored, for example, at the disk and/or the memory.

As seen in FIG. 1, a "bus" forms an operable connection between the processor, the memory, the disk, and the communication interface. The "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a vehicle or robot using protocols such as Controller Area network (CAN), Media Oriented System Transport (MOST), Local Interconnect Network (LIN), among others.

An "operable connection", or a connection by which entities are "operably connected", is one in which signals, physical communications, and/or logical communications may be sent and/or received. An operable connection may include a wireless interface, a physical interface, a data interface, and/or an electrical interface.

An "input/output device" (I/O device) as used herein may include devices for receiving input and/or devices for outputting data, such as the touchpad or the display unit. The touchpad may include sensors which enable the touchpad to detect a number of fingers a user is using or the touchpad to distinguish between multiple zones. The input and/or output may be for controlling different features which include various vehicle or robotic components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware based controls, interfaces, touch screens, touch pads, or plug and play devices. An "output device" includes, but is not limited to: display devices, and other devices for outputting information and functions.

A "robotic system", as used herein may include, but is not limited to, any automatic or manual systems that may be used to move through an environment, sense the environment, grasp objects, receive signals from other systems, etc. Exemplary robotic systems include, but are not limited to: an electronic control system, a movement system, a display system, a sensor system, a motor control system, an electronic power steering system, visual devices (e.g., camera systems, proximity sensor systems), a monitoring system, a feedback system, among others.

As used herein, the term "infer", "inference", "predict", "prediction", "estimate", or "estimation" generally refer to the process of reasoning about or inferring states of a system, a component, an environment, a user from one or more observations captured via events or data, and so on. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example robotic system for enabling interaction with physical objects as proxy objects representing virtual objects, according to one or more embodiments. The robotic system 100 of FIG. 1 may include a control unit 110, a display 112, one or more sensors 114, a motor control unit 116, a processor 120, logic circuitry, one or more modules 122, a memory 130, one or more movement portions, such as one or more arms 132 or one or more legs 134, a disk 140, a communication interface 150, and a bus 160. The robotic system 100 may communicate with one or more other devices, such as a virtual reality device 200 over a network 170 using computer communication. According to one or more aspects, the robotic system 100 or one or more of the arms 132 may include grippers, actuators, etc. Additionally, other components or control systems may be utilized in place of the processor 120. For example, according to one embodiment, processing may occur away from (e.g., as with 'beam' robotics) the robotic system 100 and the robotic system 100 may receive commands via the communication interface 150.

According to one or more aspects, a user may wear or experience virtual reality through the virtual reality device 200. For example, the virtual reality device 200 may be a virtual reality headset and may include a personal computer, processor, memory, etc. The virtual reality device 200 may run or execute a virtual reality application and a display of the virtual reality device 200 may render a virtual reality environment for the user. For example, the virtual reality application may be a racing game where the user experiences race car driving through the virtual reality headset. Thus, in this example, the user is presented (e.g., the display of the virtual reality device 200 renders) with the racing environment, a virtual reality image of the user's body or hands, and a virtual reality steering wheel.

In this regard, the robotic system 100 complements the virtual reality device 200 by grasping a real world or physical object which may resemble, but does not necessarily have to be a steering wheel. For example, the robotic system 100 may grasp or hold a Frisbee, to which the user appears as the steering wheel (e.g., because the user is wearing or experiencing virtual reality through the virtual reality device 200). Further, the user may interact with the Frisbee, using it to drive and control the virtual reality race car. Thus, when the user turns or rotates the Frisbee (e.g., utilizes it as a steering wheel), the robotic system 100 continues to grasp the Frisbee, provides tactile feedback, haptic feedback, or force feedback to the user through the Frisbee, and communicates the user's real world movement of the Frisbee to the virtual reality device 200, which enables the virtual reality device 200 to render movements or the virtual reality race environment through the virtual reality headset. In other words, the robotic system 100 may provide haptic feedback or force feedback by grasping an object associated with the virtual reality application while enabling a user to interact with that object. In this way, the robotic system 100 enables a user to interact with a physical, real world object as if that object were a control mechanism or control device within the virtual reality environment, and to effect changes to the rendering of the virtual reality environment based on the real world interaction with the physical object.

According to one or more aspects, the user may wear or experience virtual reality through the virtual reality device 200 or the virtual reality headset, running or executing the virtual reality application. The display of the virtual reality device 200 may render a virtual reality object for the user. For example, the virtual reality object may be provided to the virtual reality device 200 in the form of a CAD file. In this regard, the robotic system 100 may have different objects (e.g., primitive objects, shapes such as cylinders, cones, cubes, etc. or different textures, smooth, squishy, furry, hard, soft, etc.) available to grasp or touch. When the user reaches out into the virtual reality environment to grasp the virtual reality object, the robotic system 100 may detect or receive the position of the user's hand and 'match' what the virtual reality object should feel like by grasping one or more of the physical objects and moving those objects within reach of the user to mimic the feel of the portion of the virtual reality object that the user is touching or in contact with. Further, interactions made with the real world object may be reflected in the virtual reality device 200 or display. For example, if the virtual reality environment includes a wall, the robotic system 100 may grasp or hold a sheet of paper up to the user. If the user's tears a hole in the sheet of paper, the virtual reality device 200 may render the wall with a hole or as crumbling down, for example. In any event, one or more of the components of the robotic system 100 of FIG. 1 will be described in greater detail below.

The communication interface 150 may receive data from the virtual reality device 200, one or more mobile devices, one or more other systems, etc. over the network 170. The communication interface 150 may receive virtual reality application data associated with a virtual reality application executed on the virtual reality device 200. Examples of virtual reality applications include virtual reality racing games, virtual reality training applications, flight simulators, instrument simulators, experience simulators, etc. The virtual reality device 200 may include a virtual reality headset or a virtual reality display.

The communication interface 150 may receive a first virtual reality object data associated with a first virtual reality object from the virtual reality application. In other words, the communication interface 150 may receive virtual reality object data associated with virtual reality objects which are 'located' in the virtual reality environment and seen by the user on the virtual reality device 200. For example, if the virtual reality application is a race car simulator, the user may see a virtual reality steering wheel rendered on the display of the virtual reality device 200. In this example, the virtual reality object is the virtual reality steering wheel. The communication interface 150 may receive virtual reality object data from the virtual reality device 200 pertaining to the virtual reality steering wheel (e.g., a size, a shape, a location relative to the user, etc.). In this way, the robotic system 100 may utilize the virtual reality object data to mimic or 'synchronize' objects in the real world in relation to the virtual reality objects in the virtual environment.

The communication interface 150 may receive virtual reality event data associated with one or more events from the virtual reality application. Examples of events associated with the virtual reality application include changes in the rendering of the virtual reality device 200 or virtual reality display. This virtual reality event data may be based on events in the real world or events in the virtual reality environment.

For example, if the user (e.g., wearing the virtual reality headset) walks forward in the real world, the user walking is a real world event which, when detected by the virtual reality device 200, causes the virtual reality device 200 to render the user walking forward in the virtual reality environment. The rendering of the user walking in the virtual reality environment may be the virtual reality event data which is based on the real world event of the person physically walking through the real world environment. Stated another way, the virtual reality event data may be indicative of an event from the virtual reality application caused by the user approaching the physical object in the real world corresponding to the virtual reality object.

As another example, if the user is wearing the virtual reality headset, and there is a virtual reality object (e.g., a virtual reality bird) which passes by, the virtual reality device 200 may render the virtual reality bird. The rendering of the virtual reality bird may be the virtual reality event data which is based on the virtual reality environment event of the bird flying by the user.

In any event, the robotic system 100 may receive information or the virtual reality event data associated with these events from the virtual reality application, and grasp physical objects with which the user may interact with accordingly.

The memory 130 may store data received by the communication interface 150 as one or more instructions. For example, the memory 130 may store the virtual reality application data, the first virtual reality object data, and the virtual reality event data. This enables the robotic system 100 to determine what is being rendered to the user in terms of the virtual reality environment, virtual reality objects, the virtual version of the user with respect to the virtual reality objects, and changes which may occur (e.g., as a result of the user walking or movements associated with the virtual reality objects) between the virtual reality environment, the virtual reality objects, or the virtual reality image or version of the user. In any event, the processor 120 or modules 122 of the processor 120 may utilize the virtual reality application data, the first virtual reality object data, or the virtual reality event data to generate or calculate one or more motor control instructions, which may command the robotic system 100 to grasp and move physical objects in accordance with what is being presented or rendered on the virtual reality device 200 (e.g., virtual reality event data). The memory 130 may also store one or more instructions generated by the processor 120 or modules 122 of the processor.

The motor control unit 116 may control one or more movement portions, such as one or more appendages of the robotic system 100. Examples of movement portions include one or more arms 132, one or more legs 134, tracks, wheels, bearings, joints, etc. For example, one or more of the arms 132 of the robotic system 100 may include a robotic hand 332. The robotic hand 332 may grasp a first physical object which corresponds to the first virtual reality object of the virtual reality application. In one or more embodiments, one or more of the sensors 114 may detect when two or more physical objects are available and the processor 120 may select a physical object from the two or more physical objects to grasp based on the virtual reality application data, the virtual reality object data, or the virtual reality event data. For example, if a block of wood and a Frisbee are available or detected by one or more of the sensors 114, the virtual reality application is a race simulator application, and the virtual reality event data indicates that a steering wheel is being rendered to the user, the processor 120 may generate motor control instructions which command the legs 134 of the robotic system 100 to move to a predetermined distance within the Frisbee, and motor control instructions which command the arms 132 of the robotic system 100 to pick the Frisbee up or otherwise grasp the Frisbee based on one or more properties associated with the Frisbee (e.g., the shape) detected by one or more of the sensors 114.

As another example, the motor control module of the processor 120 may generate one or more motor control release instructions for one or more of the robotic arms 132 commanding one or more of the robotic arms 132 to release grasping of a grasped physical object. The processor 120 may execute one or more of the motor control release instructions based on the virtual reality event data, a position or a bearing of a user relative to the first physical object, detecting no user interaction with the first physical object, or upon receiving or generating another set of grasp instructions for another physical object (e.g., taking higher priority), such as a second physical object. In other words the robotic system 100 may release the physical object when virtual reality event data indicates that the user is not within a predetermined distance of a corresponding virtual reality object, the user is not facing the corresponding virtual reality object, the user is no longer interacting with the corresponding virtual reality object, it is inferred by the processor 120 that the user is not interested in the corresponding virtual reality object, etc.

The motor control module of the processor 120 may generate one or more motor control grasp instructions for one or more of the robotic arms 132 to command one or more of the robotic arms 132 to grasp a second physical object based on an inferred user interaction with a corresponding second virtual reality object. For example, if one or more of the sensors 114 detect that the user is approaching the corresponding second virtual reality object, the user is focused on or viewing the corresponding second virtual reality object, etc. In any event, the processor 120 may execute one or more of the motor control grasp instructions based on the virtual reality event data (e.g., the user moving toward the corresponding second virtual reality object) or a position of the user relative to the second physical object or the corresponding second virtual reality object. In this way, the robotic system 100 may be prepared, infer, or anticipate user interaction with one or more virtual reality objects and grasp corresponding physical objects in preparation for user interaction with the same based on virtual reality event data (e.g., the user interacting or beginning to interact with the virtual reality object).

Further, one or more of the sensors 114 may, detect a user interaction with the first physical object. In other words, the sensors 114 may determine whether the user is in contact with the physical object, an amount of force that the user is applying to the physical object, a direction of force applied to the physical object, etc.

The sensors 114 may also detect a position of the user relative to the physical object. For example, if the virtual reality event data indicates that the user is ten meters away from a virtual reality object rendered on the virtual reality device 200, the motor control module of the processor 120 may generate one or more motor control movement instructions for one or more of the movement portions, such as the legs 134 of the robotic system 100, thereby moving the robotic system 100 (which is grasping the physical object) away from the user until the virtual reality event data indicates that the user is reaching for the virtual reality object, at which time the motor control module may generate motor control instructions commanding the robotic system 100 (or arms 132 thereof) to move the physical object into the user's reach.

In one or more embodiments, one or more sensors 114 of the robotic system 100 may detect the position of the user relative to the physical object or the robotic system 100. In other embodiments, the communication interface 150 of the robotic system 100 may receive the position of the user relative to the physical object or the robotic system 100 from the virtual reality device 200 (e.g., which may implement sensors 220 of its own).

Further, one or more of the sensors 114 of the robotic system 100 may detect the position of the physical objects relative to the robotic system 100. This enables the robotic system 100 to move around and pick up or grasp a variety of physical objects based on movement of the user in the real world environment or based on virtual reality event data indicative of virtual reality objects moving towards or away from the user in the virtual reality environment. In one or more embodiments, the sensors 114 of the robotic system 100 may scan or search the real world environment for one or more available objects to grasp or hold. For example, the motor control module of the processor 120 may generate one or more motor control movement instructions for one or more of the movement portions to command one or more of the movement portions to move the robotic system 100 within a predetermined distance of the second physical object (e.g., which the processor 120 may infer that the user is going to interact with). In this regard, the processor 120 may execute one or more of the motor control movement instructions based on the virtual reality event data or a position of the user relative to the second physical object to move the robotic system 100 towards or way from the second physical object based on the virtual reality event data.

In one or more embodiments, the motor control module of the processor 120 may generate one or more motor control movement instructions commanding the robotic system 100 to mitigate robotic system interaction with the user while the user is interacting with the physical object. For example, if the user is touching or feeling his or her way around a physical object, such as a flat sheet representing a wall, the robotic system 100 may adjust the grip or grasp of the flat sheet (e.g., the physical object) based on the movement of the user's hands. In other words, if the user is 'feeling' his or her way around the flat sheet and comes within a predetermined distance of the arms 132 of the robotic system 100, the motor control module of the processor 120 may generate one or more motor control movement instructions commanding the arms 132 to shift position, away from the hands of the user (e.g., while maintaining the mimicking or parallelism between the real world environment and the virtual reality environment).

In one or more embodiments, the physical object may be manipulated by the motor control module of the processor 120 of the robotic system 100 to be relocated as the user is interacting with the physical object in a scenario where the user is experiencing or viewing a virtual object associated with a size greater than the physical object. For example, the robotic system 100 may use the physical object of a book to represent a large wall, placing the book in spots or locations where the virtual reality wall appears to the user and when the user reaches for that portion of the virtual reality wall. In this way, the robotic system 100 may relocate the physical object around in the real world space or environment. Other examples, such as the physical object being utilized to represent a virtual reality car are contemplated as well.

As discussed, one of more of the sensors 114 of the robotic system 100 may measure one or more aspects associated with the user interaction with the physical object, such as an amount or magnitude of force associated with the user interaction of the physical object, a direction of the force, a magnitude of the force, a duration of the force, associated acceleration, velocity, jerk, torque, angular velocity, angular acceleration, etc. Keeping in mind that the virtual reality device 200 may render the physical object as a control device within the virtual reality application, the user may interact with the physical device accordingly. Returning to the race car simulator example, the virtual reality steering wheel is rendered by the virtual reality device 200. The virtual reality steering wheel may be an example of a control device within the virtual reality application of the race car simulator. Based on the measurements associated with the user interaction of the Frisbee being grasped by the robotic system 100, a virtual reality event module of the processor 120 may generate a set of virtual reality event data.

In other words, if a first set of virtual reality event data includes the virtual reality version of the user driving down a straight road, and the user turns the Frisbee (e.g., acting as the steering wheel to the vehicle in the virtual reality environment), the virtual reality event module of the processor 120 may generate a second set of virtual reality event data based on the user interaction of manipulating or turning the Frisbee with a measured amount of force. For example, the communication interface 150 may transmit data associated with the amount of force from the user interaction to the virtual reality device 200 as virtual reality event data (e.g., indicative of a steering wheel turn). This generated set of virtual reality event data may be to the virtual reality device 200. In this way, a real world user interaction with a physical object as a proxy object representing a virtual object may occur, and the aspects or characteristics measured and associated with the user interaction may effect or cause changes in the virtual reality environment. The virtual reality device 200 may render one or more virtual reality events based on this input.

As another example, if the sensor 220 of the virtual reality device 200 detects that the user picks up a physical object, such as a ball, the display 210 of the virtual reality device 200 renders a virtual reality object corresponding to the ball in the virtual reality environment at a corresponding position to the physical ball in the real world environment. The physical ball may be rendered as a different virtual reality object, in one or more embodiments, such as a virtual reality trophy, for example. In any event, the virtual reality device 200 may render the virtual reality object based on movement or coordinates of a corresponding physical object in the real world environment.

In response to one or more of the virtual reality events, a force feedback module of the processor 120 may generate one or more force feedback instructions for movement of one or more of the robotic arms 132. Force feedback may include haptic feedback. For example, if the user is trying to turn right, but there is a concrete barrier in the way of the vehicle within the race simulation virtual reality environment, the force feedback instructions generated by the force feedback module may cause resistance to the right turn (e.g., the user interaction with the Frisbee or the physical object) that the user is attempting to make by turning the physical object grasped by the robotic system 100. In any event, other types of force feedback may be provided, such as vibration or rumbling, when the user is driving through a gravel or bumpy road in the race simulation virtual reality environment, for example. Thus, the force feedback instructions may command one or more of the robotic arms 132 to move while maintaining grasp of the physical object. In this way, a user may receive force feedback or tactile feedback from the robotic system 100 when touching, contacting, or interacting the physical object grasped by the robotic system 100. Further, the robotic system 100 enables the user to interact with virtual objects in the virtual reality environment by manipulating the physical object grasped by the robotic system 100.

In one or more embodiments, the force feedback module may generate one or more force feedback instructions to provide an appropriate or corresponding reactive force to a virtual reality event, to constrain movement to rotation on a corresponding axis for a device or virtual reality object within the virtual reality environment, or match one or more forces (e.g., bumps, turns) to from the content of the virtual reality application (e.g., otherwise correspond to the virtual reality event data).

The processor 120 may execute one or more of the force feedback instructions based on detecting the user interaction with the physical object and based on the virtual reality event data. For example, when the user is grasping the physical object (e.g., the Frisbee), the virtual reality event data indicates that the user is driving a vehicle with a concrete barrier on the right in the virtual reality environment, and the user attempts to turn right into the virtual reality concrete barrier, the processor 120 may execute the force feedback instructions to resist, rumble, or vibrate the physical object grasped by the robotic system 100 (e.g., and the user). In this way, the robotic system 100 disclosed herein may provide multi-purpose force feedback by selecting an appropriate physical object to grasp and presenting that physical object in accordance with virtual reality events associated with virtual reality event data.

One or more advantages may thus be provided because existing haptic feedback devices are single purpose devices, such as a game controller, for example. In other words, a game controller is merely setup to be a controller for a game, while the robotic system 100 may perform a variety of functions (e.g., other functions, such as being a multi-functional mobile assistant, walking, running, kicking a ball, serving meals, etc.). Thus, the robotic system 100 enables adaptive force feedback to be implemented based on the virtual reality application or associated virtual reality event or scenario. Other examples of functions may include providing a physical objects as a proxy steering wheel, flight stick or control stick, a leash for walking a virtual pet, a bat for a baseball simulation, a remote, etc.

The control unit 110 may include the processor 120, one or more of the modules 122, the memory 130, the disk 140, and the communication interface 150. The disk 140 may store one or more of the scenarios described herein, thereby enabling the processor 120 to recognize instances where execution of instructions may be proper. The bus 160 may enable computer communication between one or more components of the robotic system 100 or from the robotic system 100 to the virtual reality device 200. The display may render one or more notifications associated with operation of the robotic system 100 (e.g., errors messages, menus, instructions, help, battery level, etc.).

Figure 2:
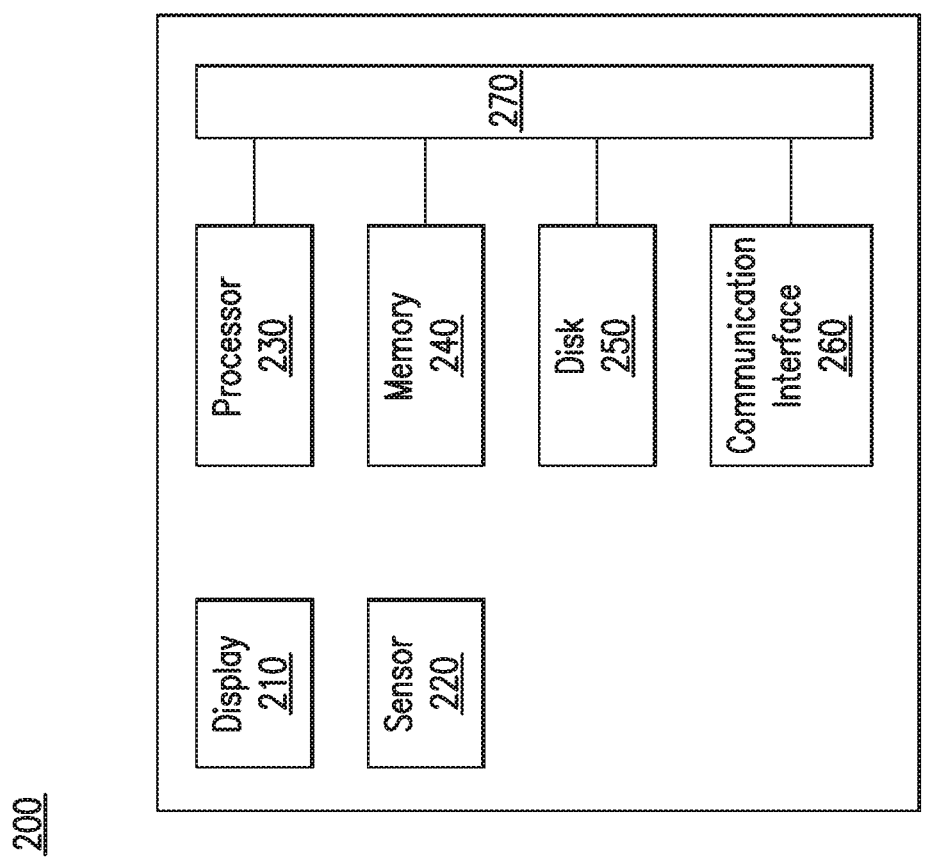
FIG. 2 is an illustration of an example virtual reality system for enabling interaction with physical objects as proxy objects representing virtual objects, according to one or more embodiments.

FIG. 2 is an illustration of an example virtual reality device 200 for enabling interaction with physical objects as proxy objects representing virtual objects, according to one or more embodiments. The virtual reality device 200 may include a display 210, sensors 220, a processor 230, a memory 240, a disk 250, a communication interface 260, and a bus 270. The communication interface 260 of the virtual reality device 200 may receive data or information from the robotic system 100 and render virtual reality objects, virtual reality events, etc. accordingly.

Figure 3:
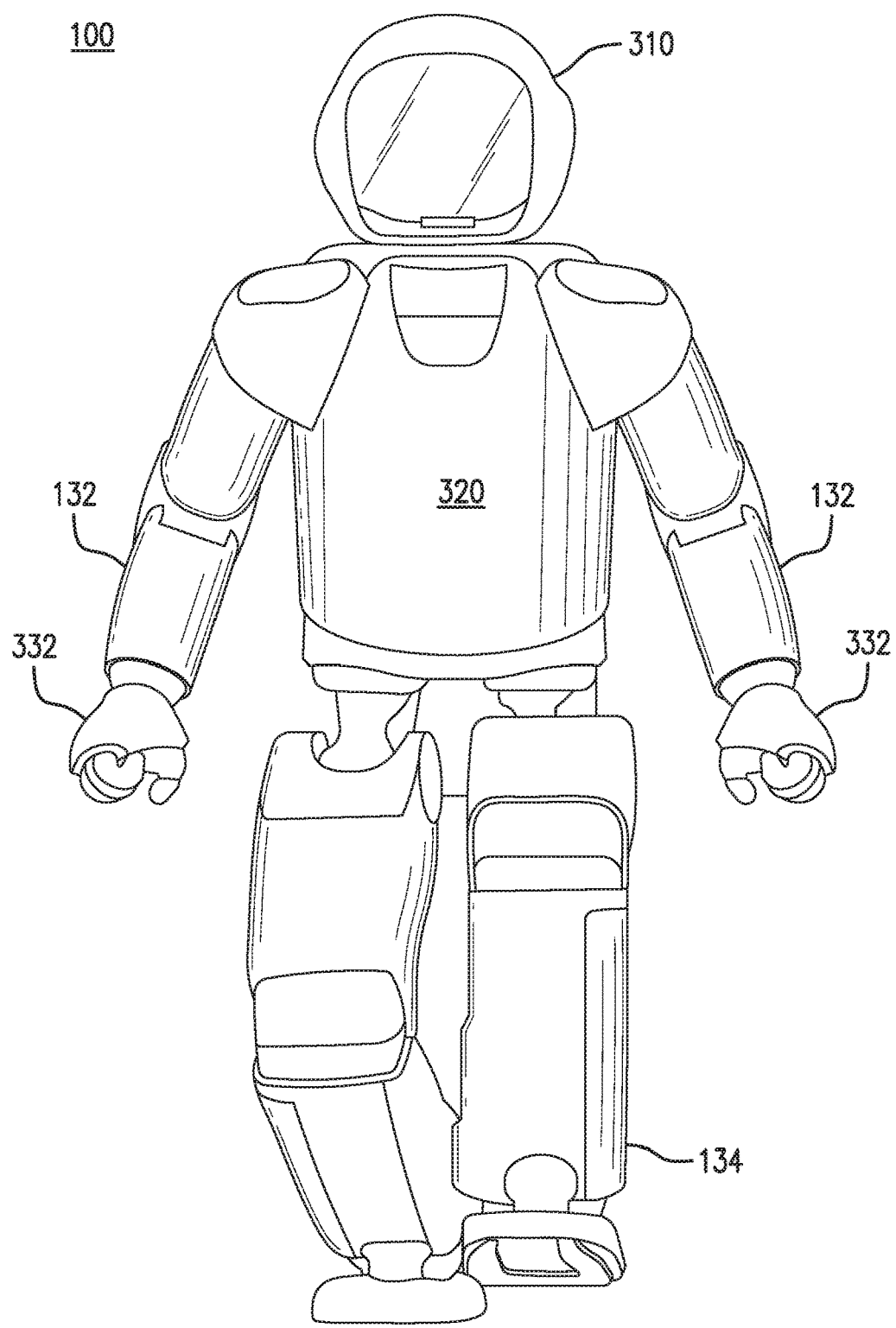
FIG. 3 is an illustration of an example robotic system for enabling interaction with physical objects as proxy objects representing virtual objects, according to one or more embodiments.

FIG. 3 is an illustration of an example robotic system for enabling interaction with physical objects as proxy objects representing virtual objects, according to one or more embodiments. In FIG. 3, the robotic system 100 includes a head 310, a body 320, the arms 132, hands 332, and the legs 134. Other examples of robotic systems are contemplated, such as drone robotic systems with graspers or actuators as arms, scada style arms, miimo style arms, etc.

Figure 4:
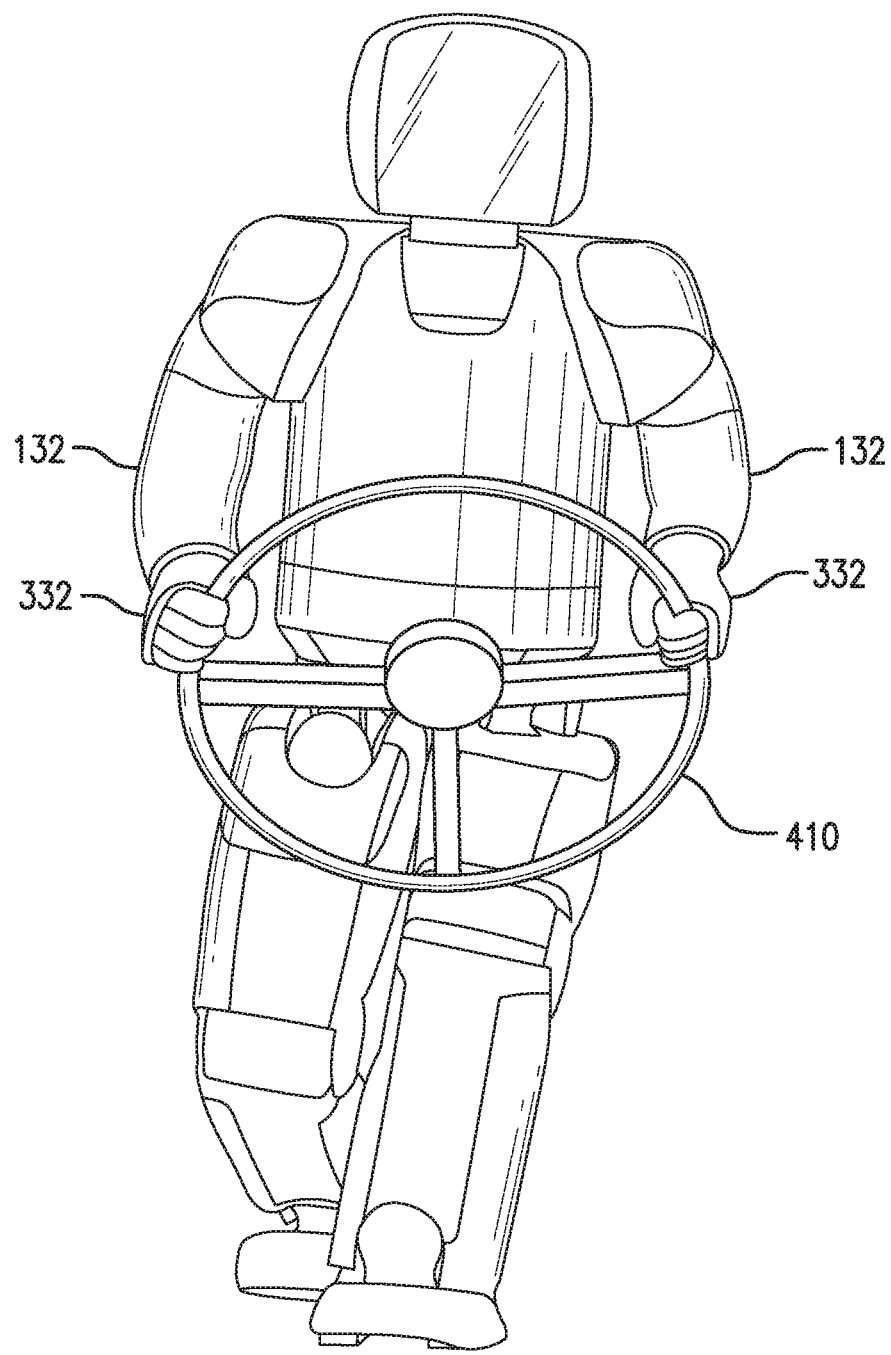
FIG. 4 is an illustration of an example robotic system for enabling interaction with physical objects as proxy objects representing virtual objects, according to one or more embodiments.

FIG. 4 is an illustration of an example robotic system for enabling interaction with physical objects as proxy objects representing virtual objects, according to one or more embodiments. FIG. 4 is an example of the robotic system 100 holding an exemplary physical object 410 (e.g., using arms 132 and hands 332). In this example, the physical object 410 is a steering wheel, although other physical objects are contemplated.

Figure 5A:
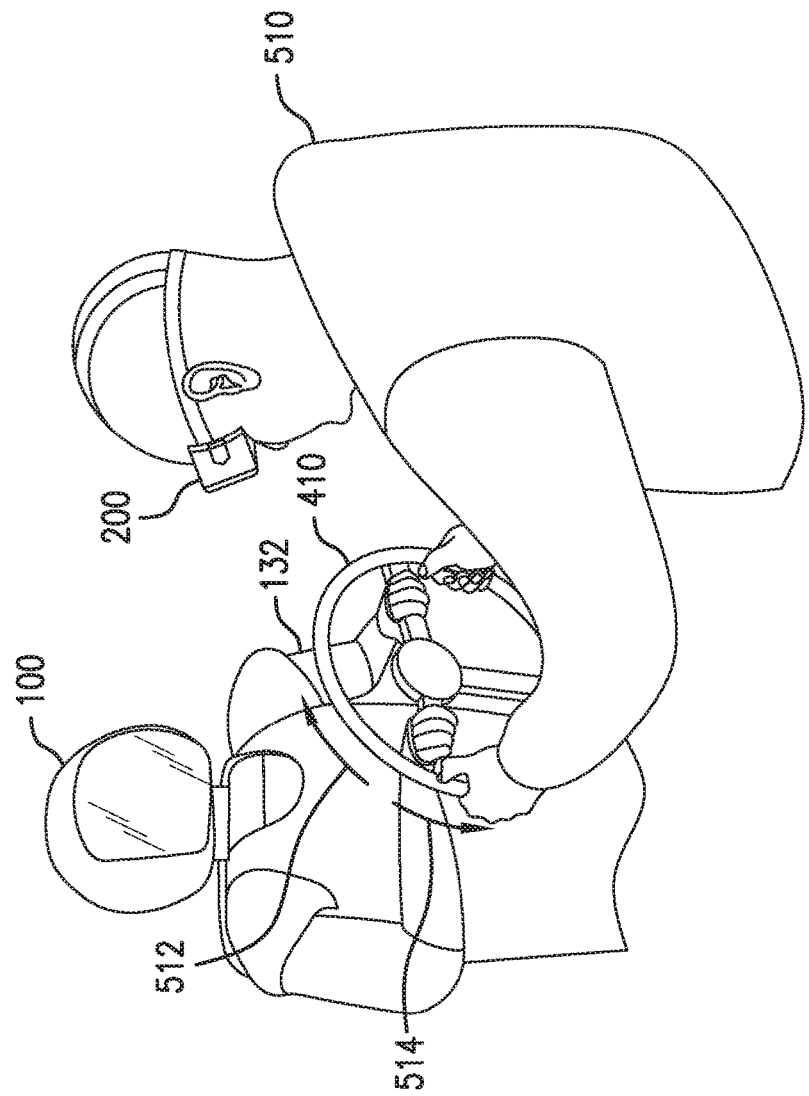
FIG. 5A is an illustration of an example robotic system where interaction with physical objects as proxy objects representing virtual objects occurs, according to one or more embodiments.

FIG. 5A is an illustration of an example robotic system where interaction with physical objects as proxy objects representing virtual objects occurs, according to one or more embodiments. In FIG. 5, a user 510 is wearing the virtual reality device 200 and interacting with the physical object 410, which is held by the arms 132 of the robotic system 100. The user 510 may interact with the physical object 410, such as by applying a force to the physical object 410. In this example, the force is a rotational force 512, and the robotic system 100 is constraining the physical object 410 to movement rotationally on an axis, as a steering wheel would be in a real world vehicle. The robotic system 100 may apply a counter rotational or reactive force 514 based on virtual reality event data, for example. In one or more embodiments, the robotic system 100 may constrain the physical object 410 to movement rotationally on the single axis until a virtual reality event occurs, such as a virtual reality car crash, for example. In such an example, force feedback may be provided along other axes (e.g., if the racecar crashes, the wheel could move suddenly along one of the previously constrained axes, providing an element of surprise or realism). In this way, the robotic system 100 advantageously provides several degrees of freedom of movement which not provided by typical controllers. The robotic system 100 or the virtual reality device 200 may not necessarily operate in a 1:1 correspondence, although this is possible in one or more embodiments. For example, a forty degree turn of the physical object 410 may be rendered as a forty-five degree turn in the virtual reality environment. In other words, compensation or adjustments between the mapping from the physical environment to the virtual reality environment may be made by the robotic system 100 or the virtual reality device 200 or processors thereof.

In one or more embodiments, the user 510 may interact with one or more portions of the robotic system 100 as the physical object. For example, the hands 332 of the robotic system 100 may be commanded to make a fist, which the user 510 could interact with, such as rotating the first as a virtual reality doorknob, for example. In this way, portions of the robotic system 100 may server as the physical object acting as a proxy for a corresponding virtual reality object. As another example, the finger of the hand 332 of the robotic system 100 may be utilized as a virtual reality pen.

Figure 5B:
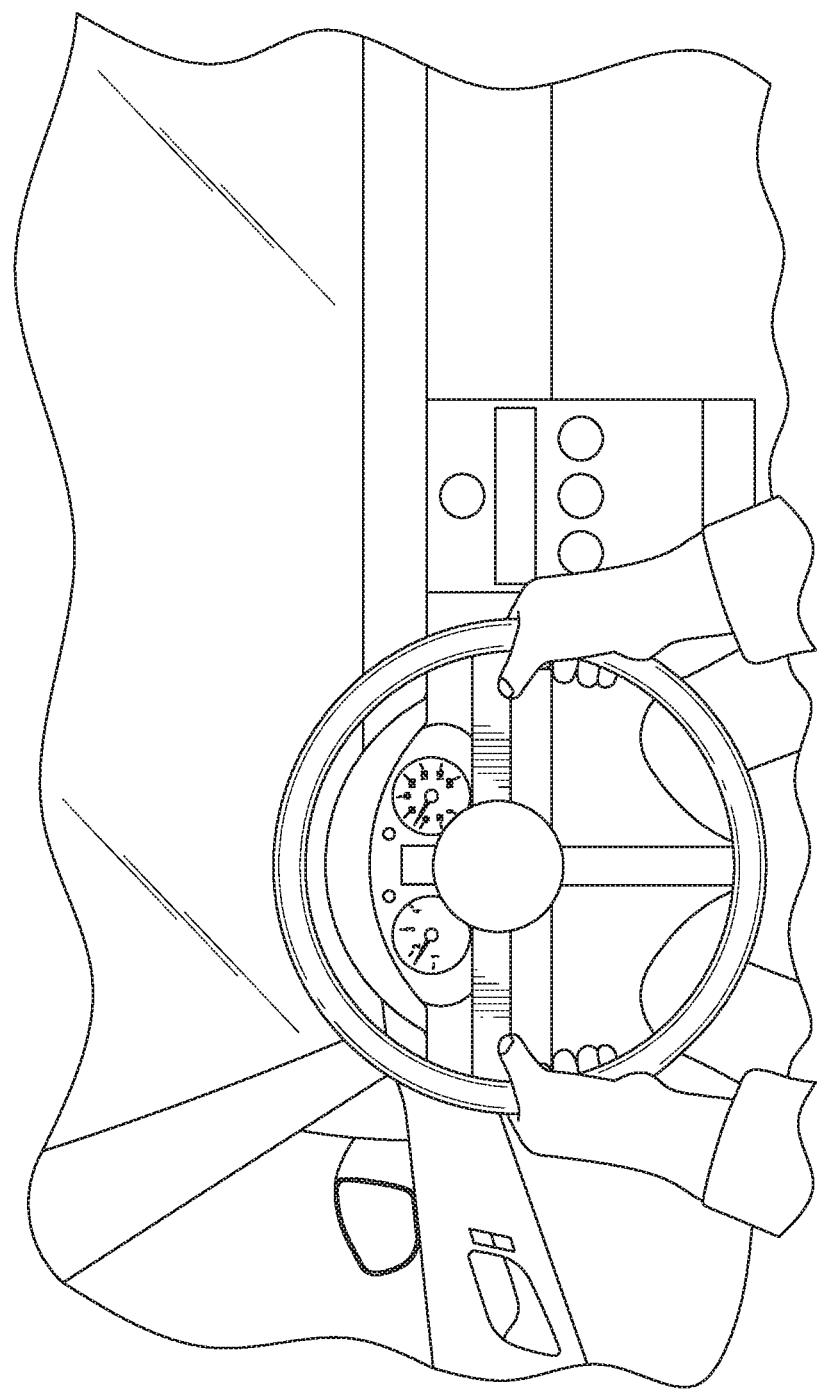
FIG. 5B is an illustration of an example virtual reality system corresponding to the scenario associated with the robotic system of FIG. 5A, according to one or more embodiments.

FIG. 5B is an illustration of an example virtual reality system corresponding to the scenario associated with the robotic system 100 of FIG. 5A, according to one or more embodiments. As seen in FIG. 5B, the user is experiencing a virtual reality environment seen through the display 210 of the virtual reality device 200. In other words, the virtual reality device 200 is running or executing the virtual reality application of a driving simulation game or a race simulation game here. The virtual reality device 200 may transmit virtual reality application data via the communication interface 260 to the communication interface 150 of the robotic system 100. Additionally, virtual reality object data, such as a first virtual reality object data associated with a first virtual reality object from the virtual reality race simulation game may be transmitted by the communication interface 260 to the communication interface 150. Similarly, virtual reality event data associated with one or more events from the virtual reality application may be transmitted by the communication interface 260 to the communication interface 150 as well.

As previously discussed, the virtual reality application data, the first virtual reality object data, and the virtual reality event data may be stored in the memory 130 or the disk 140 of the robotic system 100 as one or more instructions and utilized to generate one or more instructions to facilitate force feedback as provided through interaction with physical objects as proxy objects representing virtual objects. In this regard, the robotic arms 132 of FIG. 5A (e.g., including robotic hands 332) may grasp a physical object 410. The physical object 410 corresponds to the virtual reality object illustrated in FIG. 5B of the virtual reality or race simulation application.

With reference to FIG. 5A, the robotic system 100 or sensors 114 thereof may detect a user interaction (e.g., the rotational movement or rotational force 512 applied by the user 510) with the first physical object 410, which is the mock steering wheel in FIG. 5A. As virtual reality events occur within the virtual reality application, this virtual reality event data may be transmitted from the virtual reality device 200 to the robotic system 100. When called for by the virtual reality application (e.g., prompted or based on a virtual reality event), the force feedback module of the processor 120 may generate one or more force feedback instructions for one or more of the robotic arms 132. As an example, if the vehicle of the virtual reality race simulation application crashes, the processor 120 may generate force feedback instructions commanding one or more of the robotic arms 132 to vibrate the physical object 410 (while maintaining grasp of the physical object 410). Thus, if the user 510 is in contact, touching, or grasping the physical object 410, tactile feedback or force feedback would be provided from the robotic system 100 (or arms 132 or hands 332) to the physical object 410 to the user 510. The processor 120 may execute one or more of the force feedback instructions based on detecting the user interaction with the first physical object 410 and based on the virtual reality event data (e.g., a crash in the virtual reality environment).

Other examples of virtual reality events or corresponding virtual reality event data which may trigger the generation and execution of force feedback instructions may include a contact between a virtual reality version of the user and one or more virtual reality objects, virtual reality wind, virtual reality environment aspects (e.g., driving on a bumpy road) in the virtual reality environment, etc.

Figure 6A:
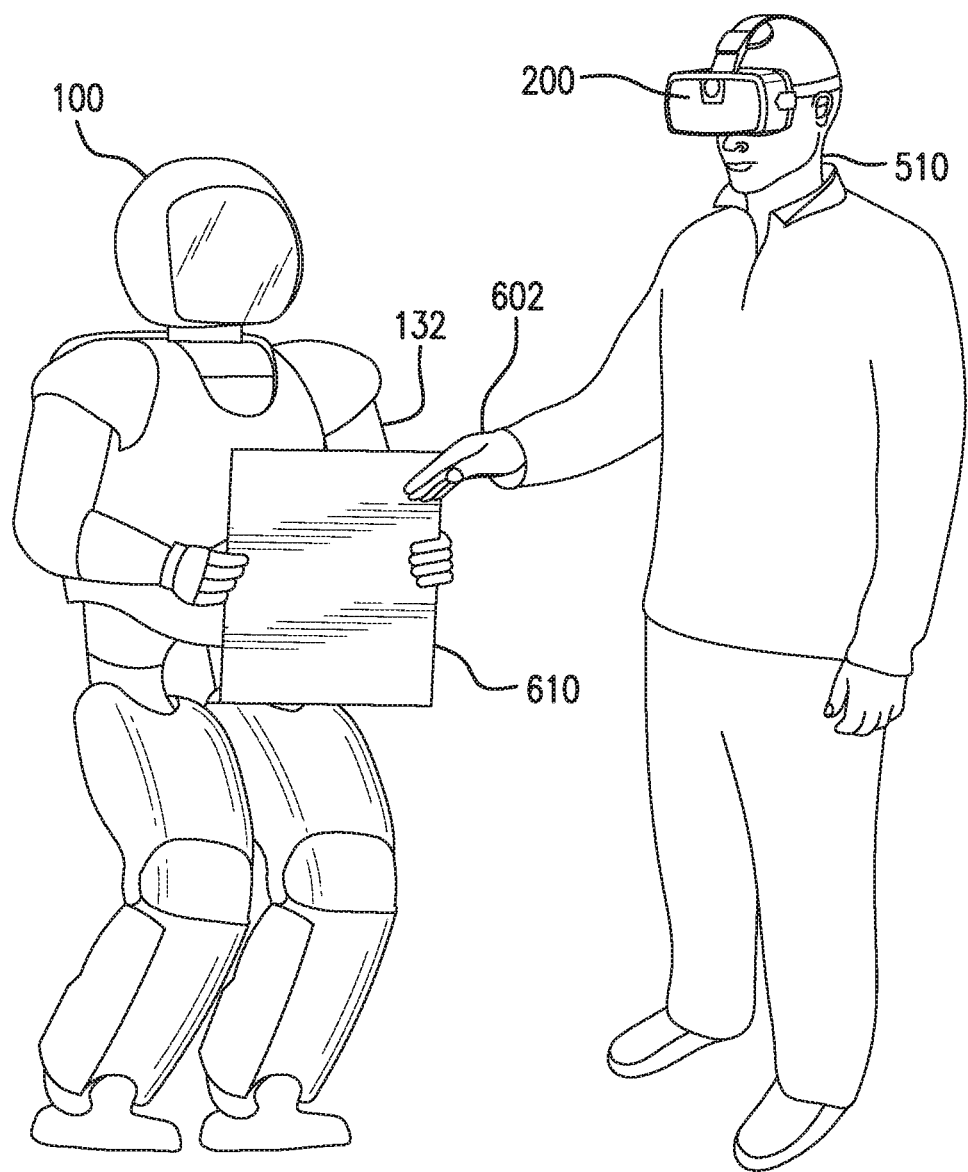
FIG. 6A is an illustration of an example robotic system where interaction with physical objects as proxy objects representing virtual objects occurs, according to one or more embodiments.
Figure 6B:
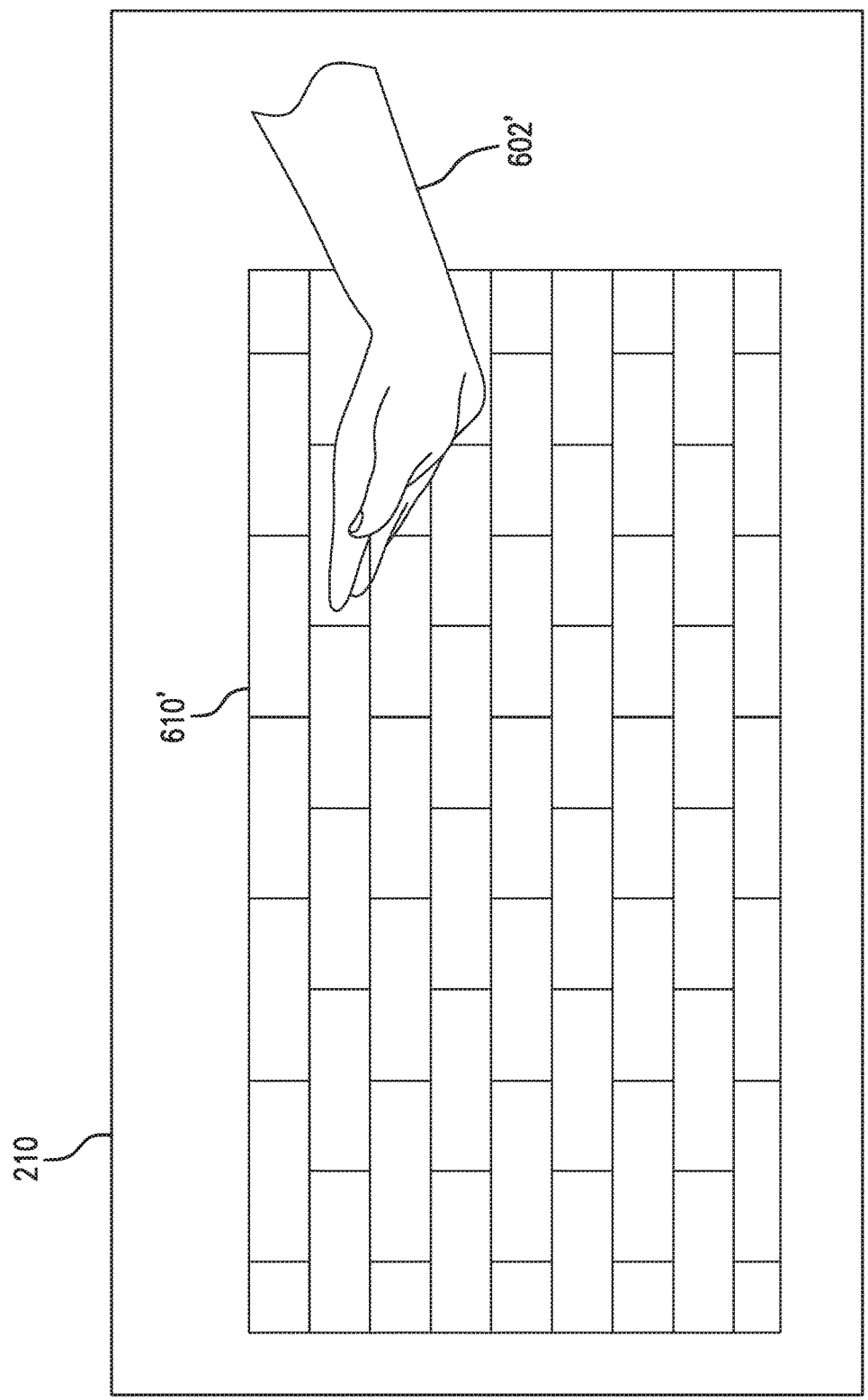
FIG. 6B is an illustration of an example virtual reality system corresponding to the scenario associated with the robotic system of FIG. 6A, according to one or more embodiments.

FIG. 6A is an illustration of an example robotic system where interaction with physical objects as proxy objects representing virtual objects occurs, according to one or more embodiments. FIG. 6B is an illustration of an example virtual reality system corresponding to the scenario associated with the robotic system 100 of FIG. 6A, according to one or more embodiments. With reference to FIGS. 6A-6B, the user 510 (e.g., wearing the virtual reality device 200) may see a virtual reality representation of his or her hand 602' touching a surface 610' as rendered on the virtual reality display 210 in the virtual reality environment. Concurrently or simultaneously, the robotic system 100 may grasp a physical object 610 which may be shaped similarly to the surface 610' (or a portion of the surface such as when a smaller physical object is being utilized as a proxy for a larger virtual object—e.g., when a cube or block is used to represent a virtual reality car) and bring the physical object 610 in contact with the user's hand 602 in accordance with the virtual reality representation of the user's hand 602' touching the virtual reality surface 610'.

In one or more embodiments, different movement speeds, movement actions, or types may be provided by the robotic system 100 based on the perceived virtual reality object or one or more attributes associated therewith. For example, if the virtual reality object is a virtual reality vehicle or car, the robotic system 100 may adjust an interaction of a physical object with the user to closer simulate the desired texture or coefficient of friction of the vehicle (e.g., slide the physical object at a different speed based on the perceived texture of the virtual reality object).

Figure 7:
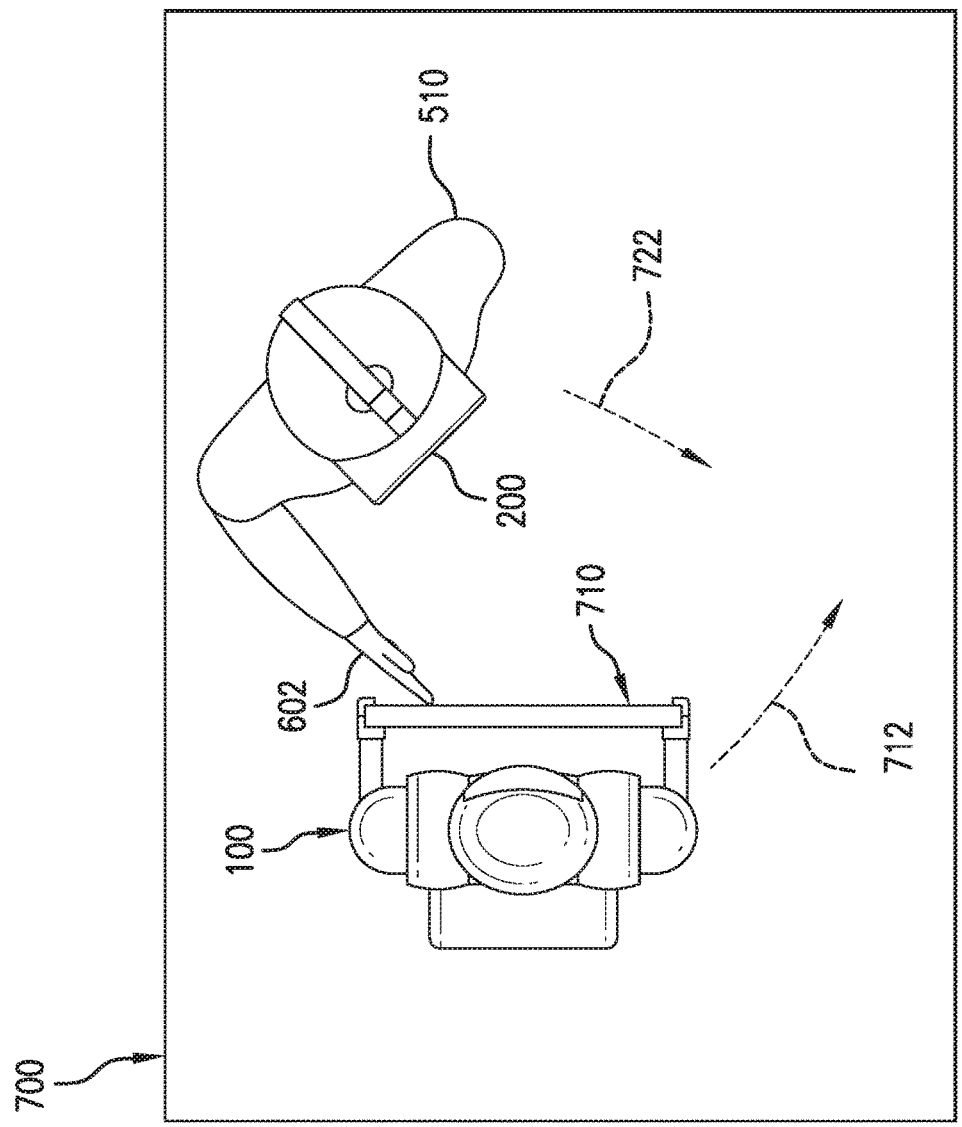
FIG. 7 is an illustration of an example robotic system and virtual reality system for enabling interaction with physical objects as proxy objects representing virtual objects, according to one or more embodiments.

FIG. 7 is an illustration of an example 700 robotic system and virtual reality system for enabling interaction with physical objects as proxy objects representing virtual objects, according to one or more embodiments. In FIG. 7, as the user 510 moves 722 and feels his or her way along a 'wall' (e.g., the physical object 710) using his or her hand 602, the robotic system 100 may move 712 in correspondence based on what the user 510 sees in the virtual reality application in the virtual reality device 200.

Figure 8:
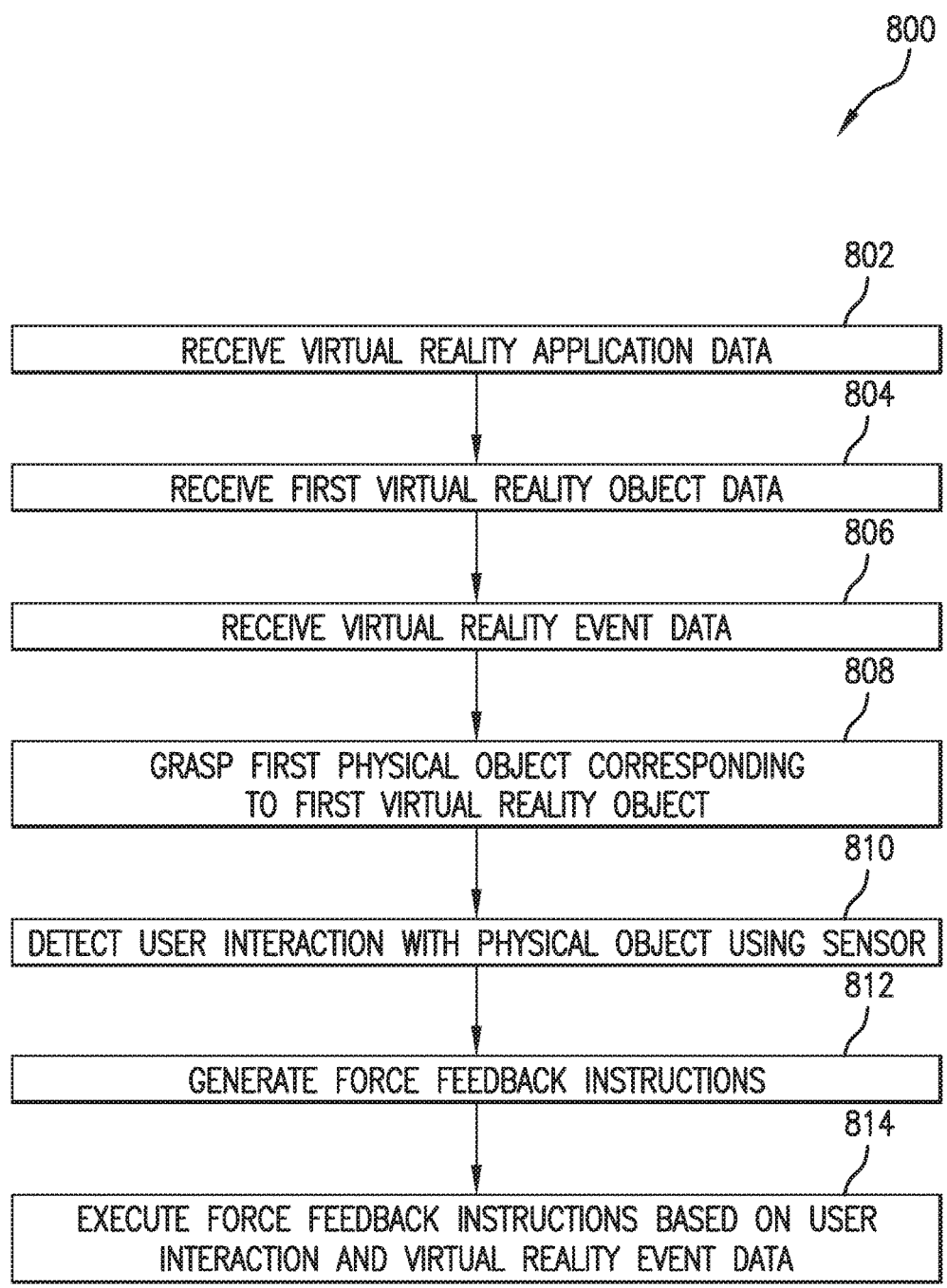
FIG. 8 is an illustration of an example flow diagram of a method for enabling interaction with physical objects as proxy objects representing virtual objects using a robotic system, according to one or more embodiments.

FIG. 8 is an illustration of an example flow diagram of a method 800 for enabling interaction with physical objects as proxy objects representing virtual objects using a robotic system, according to one or more embodiments. The method 800 may include receiving virtual reality application data associated with a virtual reality application executed on a virtual reality device at 802 (e.g., this enables the robotic system to determine what virtual reality application the user is using), receiving a first virtual reality object data associated with a first virtual reality object from the virtual reality application at 804 (e.g., this enables the robotic system to determine the virtual object with which a user may interact with and grasp a corresponding object), receiving virtual reality event data associated with one or more events from the virtual reality application at 806 (e.g., this enables the robotic system to determine whether the user is interacting with the virtual reality object and how that virtual reality object is reacting back to the user), grasping a first physical object which corresponds to the first virtual reality object of the virtual reality application using one or more robotic arms including a robotic hand at 808 (e.g., when the user interacts with the virtual reality object, the robotic system grasps the physical object for the user to interact with in the real world in a corresponding manner), detecting a user interaction with the first physical object using one or more sensors at 810

(e.g., if the user moves the physical object, the physical object may react (e.g., if the virtual reality object is a fish, the fish may flop) or provide some other input or event in the virtual reality world), generating one or more force feedback instructions for one or more of the robotic arms (e.g., the physical object may be forced to react as the virtual reality object would), wherein the force feedback instructions command one or more of the robotic arms to move while maintaining grasp of the first physical object at 812 (e.g., this reaction may be caused by having the robotic system hold an object and move the object while the user is touching or interacting with the physical object), and executing one or more of the force feedback instructions based on detecting the user interaction with the first physical object and based on the virtual reality event data at 814.

In one or more embodiments, the robotic system 100 may be capable of planning and executing a kinematic path for the robotic system 100 itself or for one or more physicals objects which are released such that the physical object interacts with the user at a predetermined time, position, velocity, energy, etc. in correspondence with one or more virtual reality events from the virtual reality device 200.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, and so on. Rather, such terms are merely used as identifiers, names, etc. for features, elements, items, and so on. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A robotic system for enabling interaction with physical objects as proxy objects representing virtual objects, comprising:

a communication interface receiving:
virtual reality application data associated with a virtual reality application executed on a virtual reality device;
a first virtual reality object data associated with a first virtual reality object from the virtual reality application; and
virtual reality event data associated with one or more events from the virtual reality application;
a memory storing the virtual reality application data, the first virtual reality object data, and the virtual reality event data as one or more instructions;
one or more robotic arms including a robotic hand grasping a first physical object which corresponds to the first virtual reality object of the virtual reality application;
one or more sensors detecting a user physical interaction with the first physical object; and
a force feedback module of a processor generating one or more force feedback instructions for one or more of the robotic arms, wherein the force feedback instructions command one or more of the robotic arms to move while maintaining grasp of the first physical object,
the processor executing one or more of the force feedback instructions based on detecting the user interaction with the first physical object and based on the virtual reality event data.

2. The robotic system of claim 1, comprising a motor control module of the processor generating one or more motor control release instructions for one or more of the robotic arms, wherein the motor control release instructions command one or more of the robotic arms to release grasping of the first physical object,
wherein the processor executes one or more of the motor control release instructions based on the virtual reality event data, a position of a user relative to the first physical object, or detecting no user interaction with the first physical object.

3. The robotic system of claim 2, wherein the motor control module of the processor generates one or more motor control grasp instructions for one or more of the robotic arms, wherein the motor control grasp instructions command one or more of the robotic arms to grasp a second physical object,
wherein the processor executes one or more of the motor control grasp instructions based on the virtual reality event data or a position of the user relative to the second physical object.

4. The robotic system of claim 2, comprising one or more movement portions,
wherein one or more of the sensors detects a position of a second physical object relative to the robotic system,
wherein the motor control module of the processor generates one or more motor control movement instructions for one or more of the movement portions, wherein the motor control movement instructions command one or more of the movement portions to move the robotic system within a predetermined distance of the second physical object,
wherein the processor executes one or more of the motor control movement instructions based on the virtual reality event data or a position of the user relative to the second physical object.

5. The robotic system of claim 1, wherein one or more of the sensors detects a position of a user relative to the first physical object.

6. The robotic system of claim 1, wherein the communication interface receives a position of a user relative to the first physical object from the virtual reality device.

7. The robotic system of claim 1, wherein one or more of the sensors measures an amount of force associated with the user interaction of the first physical object.

8. The robotic system of claim 7, wherein the communication interface transmits data associated with the amount of force from the user interaction to the virtual reality device as virtual reality event data.

9. The robotic system of claim 1, comprising a virtual reality event module of the processor generating a second set of virtual reality event data based on the user interaction with the first physical object,
wherein the first virtual reality object is a control device within the virtual reality application, and
wherein the communication interface transmits the second set of virtual reality event data to the virtual reality device.

10. The robotic system of claim 1, wherein the virtual reality event data is indicative of an event from the virtual reality application of a user approaching the first virtual reality object.

11. A method for enabling interaction with physical objects as proxy objects representing virtual objects using a robotic system, comprising:
receiving virtual reality application data associated with a virtual reality application executed on a virtual reality device;
receiving a first virtual reality object data associated with a first virtual reality object from the virtual reality application;
receiving virtual reality event data associated with one or more events from the virtual reality application;
grasping a first physical object which corresponds to the first virtual reality object of the virtual reality application using one or more robotic arms including a robotic hand;
detecting a user physical interaction with the first physical object using one or more sensors;
generating one or more force feedback instructions for one or more of the robotic arms, wherein the force feedback instructions command one or more of the robotic arms to move while maintaining grasp of the first physical object; and
executing one or more of the force feedback instructions based on detecting the user interaction with the first physical object and based on the virtual reality event data.

12. The method of claim 11, comprising:
generating one or more motor control release instructions for one or more of the robotic arms to command one or more of the robotic arms to release grasping of the first physical object; and
executing one or more of the motor control release instructions based on the virtual reality event data, a position of a user relative to the first physical object, or detecting no user interaction with the first physical object.

13. The method of claim 12, comprising:
generating one or more motor control grasp instructions for one or more of the robotic arms to command one or more of the robotic arms to grasp a second physical object; and
executing one or more of the motor control grasp instructions based on the virtual reality event data or a position of the user relative to the second physical object.

14. The method of claim 12, comprising:
detecting a position of a second physical object relative to the robotic system;
generating one or more motor control movement instructions for one or more movement portions to command one or more of the movement portions to move the robotic system within a predetermined distance of the second physical object; and
executing one or more of the motor control movement instructions based on the virtual reality event data or a position of the user relative to the second physical object.

15. The method of claim 11, comprising detecting a position of a user relative to the first physical object.

16. The method of claim 11, comprising receiving a detected position of a user relative to the first physical object.

17. The method of claim 11, comprising measuring an amount of force associated with the user interaction of the first physical object.

18. The method of claim 17, comprising transmitting data associated with the amount of force from the user interaction to the virtual reality device as virtual reality event data.

19. The method of claim 11, wherein the virtual reality event data is indicative of an event from the virtual reality application of a user approaching the first virtual reality object.

20. A robotic system for enabling interaction with physical objects as proxy objects representing virtual objects, comprising:
a communication interface receiving:
virtual reality application data associated with a virtual reality application executed on a virtual reality device;
a first virtual reality object data associated with a first virtual reality object from the virtual reality application; and
virtual reality event data associated with one or more events from the virtual reality application;
a memory storing the virtual reality application data, the first virtual reality object data, and the virtual reality event data as one or more instructions;
one or more robotic arms including a robotic hand grasping a first physical object which corresponds to the first virtual reality object of the virtual reality application;
one or more sensors detecting a user physical interaction with the first physical object and a force associated with the user interaction; and
a force feedback module of a processor generating one or more force feedback instructions for one or more of the robotic arms, wherein the force feedback instructions command one or more of the robotic arms to move while maintaining grasp of the first physical object,
the processor executing one or more of the force feedback instructions based on detecting the user interaction with the first physical object and based on the virtual reality event data.

* * * * *